US012805521B2

(12) United States Patent
Franceschini Sarria et al.

(10) Patent No.: US 12,805,521 B2
(45) Date of Patent: Nov. 24, 2026

(54) METHOD AND USE OF AN ENANTIOMER OF 3,4-DIHYDROXYPHENYLALANINE (DOPA) FOR ENHANCING PLANT ATTRACTIVENESS TO BENEFICIAL INSECTS

(71) Applicant: BIOBAB R&D, S.L., Agüimes (ES)

(72) Inventors: André Lucio Franceschini Sarria, Agüimes (ES); Ignacio Horche Trueba, Agüimes (ES)

(73) Assignee: BIOBAB R&D, S.L., Agüimes (ES)

( * ) Notice: Subject to any disclaimer, the term of this patent is extended or adjusted under 35 U.S.C. 154(b) by 611 days.

(21) Appl. No.: 18/262,614

(22) PCT Filed: Feb. 8, 2022

(86) PCT No.: PCT/EP2022/053009

§ 371 (c)(1),
(2) Date: Jul. 24, 2023

(87) PCT Pub. No.: WO2022/171626

PCT Pub. Date: Aug. 18, 2022

(65) Prior Publication Data

US 2024/0423204 A1 Dec. 26, 2024

(30) Foreign Application Priority Data

Feb. 9, 2021 (EP) .................................... 21382099

(51) Int. Cl.
*A01N 37/44* (2006.01)
*A01P 19/00* (2006.01)
*A61P 19/00* (2006.01)

(52) U.S. Cl.
CPC .............. *A01N 37/44* (2013.01); *A01P 19/00* (2021.08)

(58) Field of Classification Search
None
See application file for complete search history.

(56) References Cited

U.S. PATENT DOCUMENTS

| | | | |
|---|---|---|---|
| 4,863,962 A | 9/1989 | Karoum et al. |
| 2005/0249769 A1 | 11/2005 | Zhu et al. |

FOREIGN PATENT DOCUMENTS

| | | | |
|---|---|---|---|
| CN | 111701024 A | 9/2020 |
| EP | 0867179 A1 | 9/1998 |
| FR | 3035775 A1 | 11/2016 |
| KR | 20200048417 A | 5/2020 |
| WO | 2014144685 A2 | 9/2014 |

OTHER PUBLICATIONS

Matsuo, M. et al., "Evaluation of allelopathic potential of velvetbean (*Mucuna pruriens* (L.) DC.var.*utilis*) cultivated in Southern Kyusyu Island," Bulletin of the Faculty of Agriculture, Miyazaki University, vol. 49(1-2), pp. 79-87 (2003).*

Machine translation of: Matsuo, M. et al., "Evaluation of allelopathic potential of velvetbean (*Mucuna pruriens* (L.) DC.var.*utilis*) cultivated in Southern Kyusyu Island," Bulletin of the Faculty of Agriculture, Miyazaki University, vol. 49(1-2), pp. 79-87 (2003).*

Ciepiela et al., "Effect of L-3,4-dihydroxyphenylalanine, ornithine and gammagamma-aminobutyric acid on winter wheat resistance to grain aphid", Journal of Applied Entomology, 1999, vol. 123, No. 5, pp. 285-288.

Guo et al., "The ethological significance and olfactory detection of herbivore•induced plant volatiles in interactions of plants, herbivorous insects, and parasitoids", Arthropod-Plant Interactions, 2019, vol. 13, No. 2, pp. 161-179.

Sasso et al., "Electrophysiological and behavioural responses of *Aphidius ervi* (Hymenoptera: Braconidae) to tomato plant volatiles", Chemoecology, 2009, vol. 19, No. 4, pp. 195-201.

Laznik et al., "Are synthetic volatiles, typically emitted by insect-damaged peach cultivars, navigation signals for two-spotted lady beetle (*Adalia bipunctata* L.) and green lacewing (*Chrysoperla cornea* [Stephens]) larvae?", Journal of Plant Diseases and Protection, 2018, vol. 125, No. 6, pp. 529-538.

Zhou et al., "Use of slow-release plant infochemicals to control aphids: a first investigation in a Belgian wheat field", Scientific Reports, 2016, vol. 6, No. 1, pp. 1-8.

International Search Report and Written Opinion for Corresponding International Application No. PCT/EP2022/053009, May 2, 2022, 12 pages.

* cited by examiner

*Primary Examiner* — John Pak

(74) *Attorney, Agent, or Firm* — LUCAS & MERCANTI, LLP

(57) ABSTRACT

A method and use of an enantiomer 3,4-dihydroxyphenylalanine (DOPA) for enhancing plant attractiveness to beneficial insects by applying at least one time a composition having an effective amount of an enantiomer of DOPA selected from L-3,4-dihydroxyphenylalanine (L-DOPA) and D-3,4-dihydroxyphenylalanine (D-DOPA) or a mixture thereof to the leaves, stem and/or roots of the plant. The method provides an economical control of harmful insect pests and even allows preventive control prior to an infestation. As well as provide increases attraction of beneficial insects which in turn provide for an increased growth and propagation of the plant.

10 Claims, 6 Drawing Sheets

METHOD AND USE OF AN ENANTIOMER OF 3,4-DIHYDROXYPHENYLALANINE (DOPA) FOR ENHANCING PLANT ATTRACTIVENESS TO BENEFICIAL INSECTS

CROSS-REFERENCE TO RELATED APPLICATIONS

This application is a 371 of PCT/EP2022/053009, filed Feb. 8, 2022, which claims the benefit of European Patent Application No. 21382099.6, filed Feb. 9, 2021, each of which are incorporated herein by reference.

TECHNICAL FIELD

The present invention is related to a new method and use of an enantiomer of 3,4-dihydroxyphenylalanine (DOPA) for regulating self-protection in plants, more specifically for enhancing plant attractiveness to beneficial insects.

BACKGROUND OF THE INVENTION 3,4-dihydroxyphenylalanine, known as DOPA, is a non-protein amino acid that is widely distributed in the plants. This non-protein amino acid constitutes a numerous group of secondary metabolites and represent a relevant reservoir of nitrogen and carbon. Among them, L-3,4-dihydroxyphenylalanine (L-DOPA) and 3,4-dihydroxyphenethylamine (dopamine) possess relevant physiological and biochemical effects on plants (Baluška F, et al). DOPA has two isomers the L-3,4-dihydroxyphenylalanine also known as Levodopa or L-DOPA and D-3,4-dihydroxyphenylalanine also known as Dextrodopa or D-DOPA.

DOPA is present in tissue of animals, plants, and humans as well, its production is via biosynthesis from the amino acid tyrosine by the enzyme tyrosine hydroxylase, and is the precursor to the neurotransmitters: dopamine, norepinephrine, and epinephrine.

DOPA is widely used since 1961, as the most effective drug treatment of Parkinson's disease (PD) (for example, EP0867179A1, U.S. Pat. No. 4,863,962A and CN111701024A) and its uses are mainly related to the pharmaceutical field.

In the agriculture field, many studies have been describing the use of DOPA as allelochemical. This compounds typically suppresses seed germination, cause injury to root and inhibit seedling growth. Nishihara, E. et al (2004) reported L-DOPA as the strongest natural allelochemical with significant physiological and biochemical effects on plants, for example, the compound reduced the growth (especially radicle and hypocotyl) of many plants.

On the other hand, document KR20200048417A describes a composition for promoting resistance to plant diseases, comprising a copolymer synthesized by adding a copolymer of catechol and vanillic acid or a mixture of catechol and the vanillic acid with L-3,4-dihydroxyphenylalanine (L-DOPA). This composition can be used for promoting plant growth, as fertilizer, and as soil improver due to an excellent effect of promoting disease resistance of plants. Specifically, the plant disease is a bacterial plant disease.

However, the use of DOPA and/or its isomers for other agricultural purposes, such as pest control, has not been described in the state of the art. Pest control in agriculture is mainly based on the application of insecticides, which may impact nontarget beneficial organisms leading to undesirable ecological effects.

DESCRIPTION OF THE INVENTION

The application of an enantiomer of DOPA, such as L-3,4-dihydroxyphenylalanine (L-DOPA) or D-3,4-dihydroxyphenylalanine (D-DOPA), or a mixture thereof has direct signaling roles in attraction of aphids' predators and parasitoids, and as an airborne signal inducing production of VOCs that stimulate foraging by parasitoids.

Plants can defend themselves against herbivore damage, becoming repellent to other incoming herbivores and attractive to beneficial insects. This response is reflected in the emission of volatile organic compounds (VOCs) that can serve as foraging cues for natural enemies. Analysis of this VOC's showed that the exogenous application of DOPA or an enantiomer thereof in plants significantly increased the emission of VOCs, more specifically, the emission of 6-methyl-5-hepten-2-one, ocimene, cis-3-hexen-1-ol and cis-3-hexenyl acetate, among others.

This provides economical control of harmful insect pests and even allows preventive control prior to an infestation. As well as provide increases attraction of beneficial insects which in turn provide for an increased growth and propagation of the plant.

In a first aspect, the present invention refers to a method for enhancing plant attractiveness to beneficial insects, characterized in that it comprises applying at least one time a composition comprising an effective amount of an enantiomer of 3,4-dihydroxyphenylalanine (DOPA) selected from the group consisting of L-3,4-dihydroxyphenylalanine (L-DOPA) and D-3,4-dihydroxyphenylalanine (D-DOPA) or a mixture thereof to the leaves, stem and/or roots of the plant.

The enantiomers of DOPA used in the present invention can be synthetic, for example produced by organic synthesis, or can be isolated from natural sources, for example isolated from plant extracts or isolated from microorganism extract.

In a preferred embodiment, the beneficial insects belong to the Braconidae family. The Braconidae constitute one of the most species-rich families of insects. The vast majority of braconids are primary parasitoids of other insects, especially upon the larval stages of Coleoptera, Diptera, and Lepidoptera but also including some hemimetabolous insects (aphids, heteropteran, embiidina, etc).

In a preferred embodiment, the beneficial insects belong to the Aphidiinae subfamily, and specifically the beneficial insect is *Aphidius ervi*.

In a preferred embodiment, the plant is selected from plant species belongs to the Poaceae family, Solanaceae family, Brassicaceae family, Rutaceae family, Rosacea family, Rhamnaceae family, Apiaceae family and Leguminosae family, among others.

In the method of the first aspect of the present invention, the composition is applied to the plant before a pest infestation or after the application of a chemical agent selected from insecticide, fungicide, acaricide, antivirus and chemical compounds to control a pest infestation or a mixture thereof.

In the method of the first aspect of the present invention, the composition is applied at least one time to the plant by spraying, spreading, fogging, dipping, drenching, dusting, injection into the plant or plant substrate, application through the roots or adding in the irrigation water. Preferably, by foliar spraying or by adding in the irrigation water.

In the method of the first aspect of the present invention, the composition is applied to plants in hydroponic or soil culture cultivation. Furthermore, the composition is applied to the plant at least once every three months, preferably at least once a month, more preferably at least once a week.

In the method of the first aspect of the present invention, the composition comprises a further active ingredient selected from the group consisting of phytohormones, herbicides, fungicides, amino acids, humics components, organic compounds, polyphenolics, micronutrients, fertilizers, elicitors, plant growth regulators, biostimulants and combinations thereof.

In a second aspect, the present invention refers to the use of an enantiomer of 3,4-dihydroxyphenylalanine (DOPA) selected from the group consisting of L-3,4-dihydroxyphenylalanine (L-DOPA) and D-3,4-dihydroxyphenylalanine (D-DOPA) or a mixture thereof for enhancing plant attractiveness to beneficial insects.

In a preferred embodiment, the beneficial insects belong to the Braconidae family. Specifically, the beneficial insects belong to the Aphidiinae subfamily, and more specifically the beneficial insect is *Aphidius ervi.*

In a preferred embodiment, the plant is selected from plant species belongs to the Poaceae family, Solanaceae family, Brassicaceae family, Rutaceae family, Rosacea family, Rhamnaceae family, Apiaceae family and Leguminosae family, among others.

In a third aspect, the present invention refers to a method for the treatment or prevention of pests in plants, characterized in that it comprises applying at least one time a composition comprising an effective amount of an enantiomer of 3,4-dihydroxyphenylalanine (DOPA) or a mixture thereof to the leaves, stem and/or roots of the plant.

In a preferred embodiment, the pest is Aphid pest. Aphids are among the most destructive insect pests on cultivated plants in temperate regions. Control of aphids is not easy. Insecticides do not always produce reliable results, given resistance to several classes of insecticide and the fact that aphids often feed on the undersides of leaves. Therefore, the third aspect of the present invention is an ecological and effective alternative for the treatment or prevention of aphid pests in plants.

In a preferred embodiment, the plant is selected from plant species belongs to the Poaceae family, Solanaceae family, Brassicaceae family, Rutaceae family, Rosacea family, Rhamnaceae family, Apiaceae family and Leguminosae family, among others.

In the method of the third aspect of the present invention, the composition is applied to the plant before a pest infestation or after the application of a chemical agent selected from insecticide, fungicide, acaricide, antivirus and chemical compounds to control a pest infestation or a mixture thereof.

In the method of the third aspect of the present invention, the composition is applied at least one time to the plant by spraying, spreading, fogging, dipping, drenching, dusting, injection into the plant substrate, application through the roots or adding in the irrigation water. Preferably, by foliar spraying or by adding in the irrigation water.

In the method of the third aspect of the present invention, the composition is applied to plants in hydroponic or soil culture cultivation. Furthermore, the composition is applied to the plant at least once every three months, preferably at least once a month, more preferably at least once a week.

In the method of the third aspect of the present invention, the composition comprises a further active ingredient selected from the group consisting of phytohormones, herbicides, fungicides, amino acids, humics components, organic compounds, polyphenolics, micronutrients, fertilizers, elicitors, plant growth regulators, biostimulants and combinations thereof.

In a fourth aspect, the present invention refers to the use of an enantiomer of 3,4-dihydroxyphenylalanine (DOPA) selected from the group consisting of L-3,4-dihydroxyphenylalanine (L-DOPA) and D-3,4-dihydroxyphenylalanine (D-DOPA) or a mixture thereof for the treatment or prevention of pests in plants.

In a preferred embodiment, the beneficial insects belong to the Braconidae family. Specifically, the beneficial insects belong to the Aphidiinae subfamily, and more specifically the beneficial insect is *Aphidius ervi.*

In a preferred embodiment, the plant is selected from plant is selected from plant species belongs to the Poaceae family, Solanaceae family, Brassicaceae family, Rutaceae family, Rosacea family, Rhamnaceae family, Apiaceae family and Leguminosae family, among others.

In a fifth aspect, the present invention refers to a method for change the concentration of the volatile organic compound (VOCs) in plants, characterized in that it comprises applying at least one time a composition comprising an effective amount of an enantiomer of 3,4-dihydroxyphenylalanine (DOPA) selected d from the group consisting of L-3,4-dihydroxyphenylalanine (L-DOPA) and D-3,4-dihydroxyphenylalanine (D-DOPA) or a mixture thereof to the leaves, stem and/or roots of the plant.

The method of the fifth aspect of the present invention produces a change in the concentration of at least one of volatile organic compound (VOCs) in plants that makes the plant more attractive to beneficial insects. Preferably, the method changes the concentration of at least one of VOCs selected from the group consisting of 6-methyl-5-hepten-2-one, ocimene, cis-3-hexen-1-ol and cis-3-hexenyl acetate, among others.

Preferably, the change of concentration of the compound 6-methyl-5-hepten-2-one is between 50-15 wt %, preferably between 40-20 wt %, more preferably more than 35-25 wt %.

Preferably, the change of concentration of the compound ocimene is between 75-30 wt %, preferably between 65-40 wt %, more preferably more than 60-50 wt %.

Preferably, the change of concentration of the compound cis-3-hexen-1-ol is between 40-5 wt %, preferably between 30-10 wt %, more preferably more than 25-13 wt %.

Preferably, the change of concentration of the compound cis-3-hexenyl acetate is between 45-5 wt %, preferably between 30-10 wt %, more preferably more than 25-13 wt %.

In a preferred embodiment, the beneficial insects belong to the Braconidae family. Specifically, the beneficial insects belong to the Aphidiinae subfamily, and more specifically the beneficial insect is *Aphidius ervi.*

In a preferred embodiment, the plant is selected from plant species belongs to the Poaceae family, Solanaceae family, Brassicaceae family, Rutaceae family, Rosacea family, Rhamnaceae family, Apiaceae family and Leguminosae family.

In the method of the fifth aspect of the present invention, the composition is applied to the plant before a pest infestation or after the application of a chemical agent selected from insecticide, fungicide, acaricide, antivirus and chemical compounds to control a pest infestation or a mixture thereof.

In the method of the fifth aspect of the present invention, the composition is applied at least one time to the plant by spraying, spreading, fogging, dipping, drenching, dusting, injection into the plant or plant substrate, application through the roots or adding in the irrigation water. Preferably, by foliar spraying or by adding in the irrigation water.

In the method of the fifth aspect of the present invention, the composition is applied to plants in hydroponic or soil culture cultivation. Furthermore, the composition is applied to the plant at least once every three months, preferably at least once a month, more preferably at least once a week.

In the method of the fifth aspect of the present invention, the composition comprises a further active ingredient selected from the group consisting of phytohormones, herbicides, fungicides, amino acids, humics components, organic compounds, polyphenolics, micronutrients, fertilizers, elicitors, plant growth regulators, biostimulants and combinations thereof.

In a sixth aspect, the present invention refers to the use of an enantiomer of 3,4-dihydroxyphenylalanine (DOPA) selected from the group consisting of L-3,4-dihydroxyphenylalanine (L-DOPA) and D-3,4-dihydroxyphenylalanine (D-DOPA) or a mixture thereof for change the concentration of the volatile organic compound (VOCs) in plants.

The VOCs are 6-methyl-5-hepten-2-one, ocimene, cis-3-hexen-1-ol and cis-3-hexenyl acetate.

In a preferred embodiment, the beneficial insects belong to the Braconidae family. Specifically, the beneficial insects belong to the Aphidiinae subfamily, and more specifically the beneficial insect is *Aphidius ervi*.

In a preferred embodiment, the plant is selected from plant is selected from plant species belongs to the Poaceae family, Solanaceae family, Brassicaceae family, Rutaceae family, Rosacea family, Rhamnaceae family, Apiaceae family and Leguminosae family, among others.

As used herein, the term "enhancing plant attractiveness" has the meaning that there is a greater attraction of beneficial insects to the plant. It also refers to the fact that beneficial insects have a longer residence time on the plant, approximately up to 20% more than the untreated plants.

As used herein, the term "beneficial insects" has the meaning commonly attributed in the state of the art, this is, those insects that act as parasites and predators on other insects. Specifically, act as aphids' predators and parasitoids.

As used herein, the term "pest", has the meaning commonly attributed in the state of the art, this is, any species, strain or biotype of plant, animal, or pathogenic agent injurious to plants or plant products.

As used herein, the term "pest infestation", has the meaning commonly attributed in the state of the art, this is, the occurrence of one or more pest species in an area or location where their numbers and impact are currently or potentially at intolerable levels.

BRIEF DESCRIPTION OF DRAWINGS

The following figures are described below. These illustrate the exemplary embodiments and are not limiting their scope.

DESCRIPTION OF EMBODIMENTS

Example 1. Behavioral Assays on Bean Plants (*Vicia faba*) in Soil

Broad bean seeds (*Vicia faba* cv *Aguadulce supersimonia*) were planted individually in plastic pots (6×6×9 cm) filled with Traysubstrat topsoil (Klasmann-Deilmann GmbH) or a mixture of agriperlite, vermiculite, and sand (1:1:1) and grown in an environmental chamber (24±2° C., 45±10% RH, 14 h:8 h L:D).

For this example, bean plants of 3-4 weeks were used. Plants were treated by soil application of the two isomers of DOPA: 3,4-dihydroxy-L-phenylalanine (Alfa Aesar, CAS Number 59-92-7) and 3,4-dihydroxy-D-phenylalanine (Sigma Aldrich, CAS Number 5796-17-8).

Untreated plants were also used as control.

The attractiveness of beneficial insects, specifically *Aphidius ervi*, towards a bean plants treated with the isomers of DOPA compared to clean bean plant (control) was evaluated in an olfactometer.

The behavioral response of *A. ervi* were evaluated over 10 min in a two-way olfactometer. Only active insects, i.e. insects that spent at least 60 s in the treatment (trt) and/or control (cnt) arm of the olfactometer were taken into account.

The results obtained in this example are expressed as a percentage of residence time in each olfactometer arm where the parasitoid remained, relative to the total time spent in the two arms. Paired t-tests were conducted using R (free software environment for statistical computing and graphics).

Figure 1:
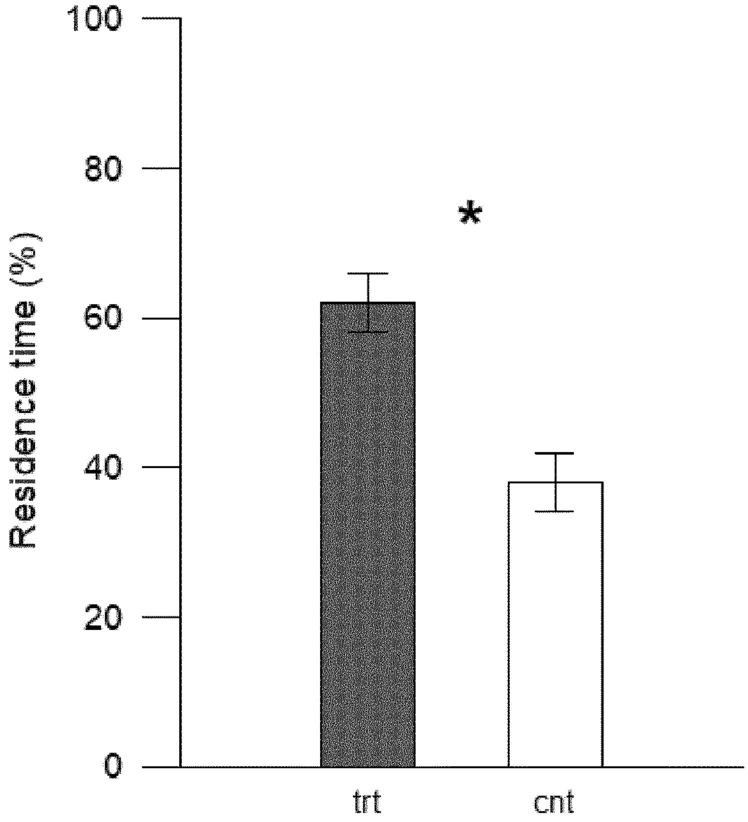
FIG. 1 shows the residence time (%) of *Aphidius ervi* females in the treatment (trt) versus control (cnt) arm of a two-way olfactometer. Treatment (trt) is a bean plant (*Vicia faba*) treated with L-Dopa meanwhile control (cnt) is a clean bean plant. Data were analyzed by means of a paired t-test ("*": P<0.05).
Figure 2:
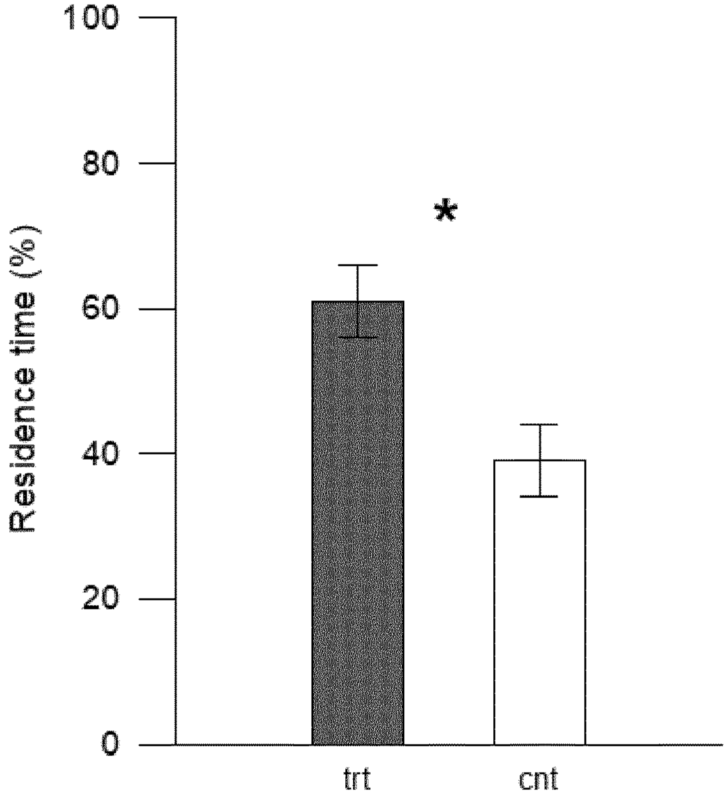
FIG. 2 shows the residence time (%) of *Aphidius ervi* females in the treatment (trt) versus control (cnt) arm of a two-way olfactometer. Treatment (trt) is a bean plant (*Vicia faba*) treated with D-Dopa meanwhile control (cnt) is a clean bean plant. Data were analyzed by means of a paired t-test ("*": P<0.05).

FIGS. 1 and 2 show the percentage of residence time of females of *A. ervi* attracted by bean plants treated with L-DOPA and D-DOPA, respectively, compared to clean plants. The residence time for the treated bean plants was higher (approx. +20%) than the obtained for untreated plants.

Example 2. Induction Assay on Bean Plants (*Vicia faba*) in Soil

Broad beans (*Vicia faba* cv *Histal*) plants were grown in a mixture of sterile soil/vermiculite (7:3) for 10 days, and treated with L-DOPA (10 μg), D-DOPA (10 μg) or HPLC water (control, 10 μl) dissolved in 30 mL of distilled water.

After 24 h, the volatile organic compounds (VOCs) emitted from the plant were collected through a dynamic headspace.

The bean plants were enclosed in a glass vessel with a volume of 3.2 I. The bottom of the vessel was enclosed around the top of the pot. Air that had been purified by passage through an activated charcoal filter (BDH, 10-14 mesh) was pushed into (750 ml·min$^{-1}$) and pulled (700 ml·min$^{-1}$) out of the vessel. VOCs were trapped onto Porapack™ (Porous Polymer Adsorbent) 50/80 mesh (50 mg; Supelco, Bellefonte, USA) held in glass tubing (5 mm outer diameter) by two plugs of silanised glass wool. The Porapack™ tube was conditioned by washing with redistilled diethyl ether (2 ml) and heating at 130° C. for 4 h under a stream of purified nitrogen.

VOCs collected on the Porapak™ were eluted with 750 μL of redistilled diethyl ether and the samples were stored at −20° C. until chromatographic analysis.

For the analysis, four samples (1 μL) from each treatment (L-DOPA, D-DOPA and Control) were analyzed on an Agilent 7820A Gas Chromatograph (Agilent Technologies, Santa Clara, California, USA), equipped with a cool column injector, flame ionization detector (FID), and a HP-1 capillary GC column (50 m×0.32 mm internal diameter×0.52 μm film thickness). Hydrogen was the carrier gas. The oven temperature was maintained at 30° C. for 0.1 min, then programmed to increase at 10° C.·min$^{-1}$ until 250° C., and then held for 38 min. Tentative identifications were made by Kovats' Index values and GC peak enhancement on GC columns of HP-1, using authentic samples of chemicals compounds.

Figure 3:
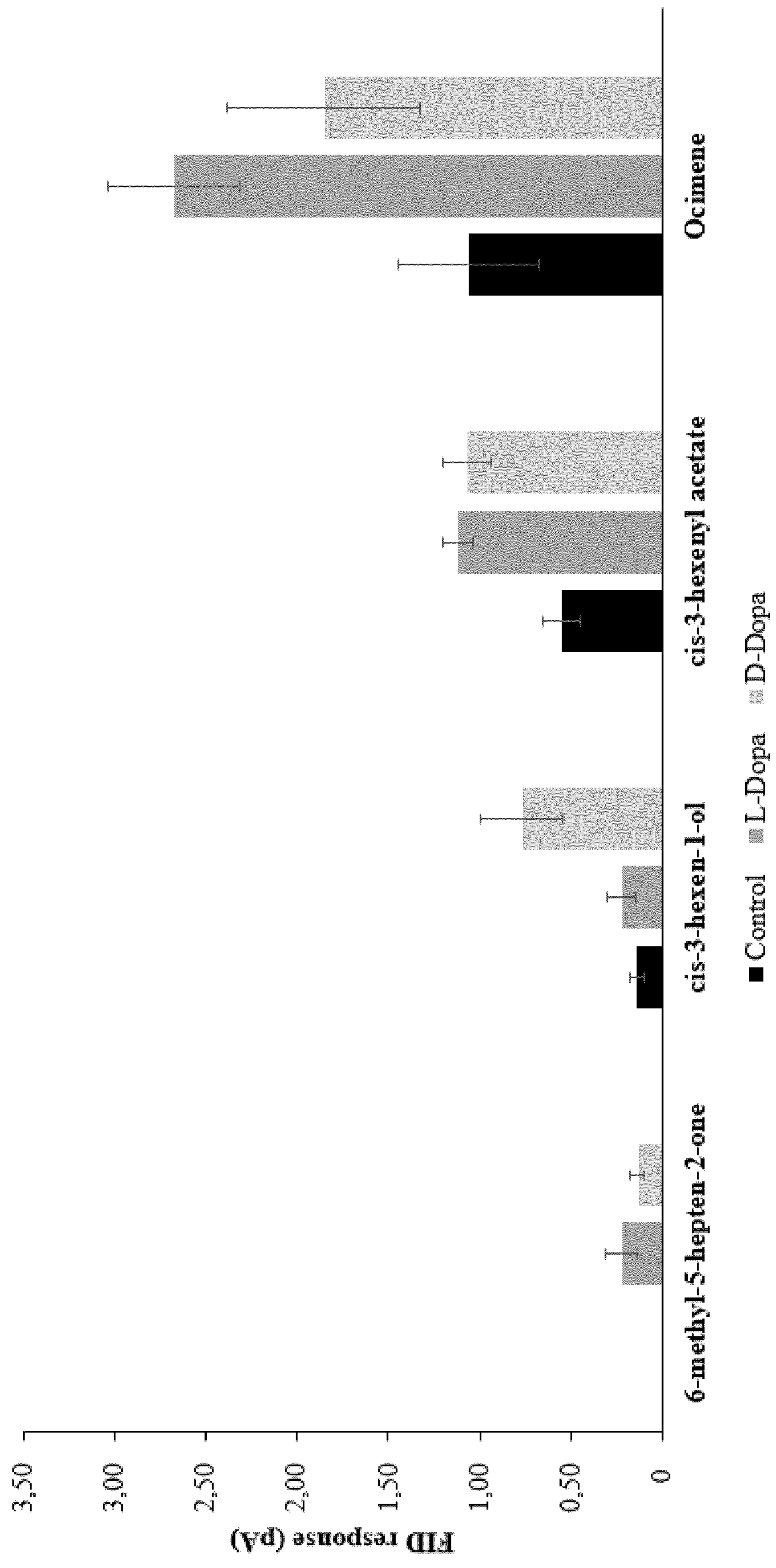
FIG. 3 shows the FID response (pA) of the volatile organic compounds (VOCs) 6-methyl-5-hepten-2one, cis-3-hexen-1-ol, cis-3-hexenyl acetate and Ocimene, produced by bean plants (*Vicia faba*) grown in untreated mixture of soil/vermiculite (control) and treated mixture of soil/vermiculite with L-DOPA and D-DOPA at 0.1 ppm.

The results obtained are represented in FIG. 3. A change is observed in the concentration of VOCs triggered by the action of L-DOPA and D-DOPA on the plant. However, in untreated plants (control) it is observed that the concentration is lower, and even some compounds are not emitted, as 6-methyl-5-hepten-2one.

Therefore, it is confirmed that the exogenous application of DOPA or an enantiomer thereof in plants significantly increases the emission of VOCs.

Example 3. Induction Assay on Bean Plants (*Vicia faba*) in Hydroponic Medium Broad beans (*Vicia faba* cv *Histal*) were potted in sterile vermiculite and kept in a glasshouse at 23° C. After 7 days, the seedlings were gently removed from the vermiculite, the cotyledons peeled and the roots rinsed with bidistilled water, carefully brushing away all soil particles. They were then placed in glass beakers containing a hydroponic solution made with Hoagland's modified basalt salt mixture, (MP, USA), and maintained in an environmental chamber at 23° C. Each beaker, containing three seedlings, was wrapped in aluminum foil to hold the plants in position and to prevent the light from reaching the roots. Every 4 days, the hydroponic solution in each beaker was renewed. After 10 days plants were treated with L-DOPA (10 μg), D-DOPA (10 μg) or HPLC water (control, 10 μl) dissolved in 30 mL of distilled water.

The bean plants were enclosed in a glass vessel with a volume of 3.2 I. The bottom of the vessel was enclosed around the top of the pot. Air that had been purified by passage through an activated charcoal filter (BDH, 10-14 mesh) was pushed into (750 ml·min$^{-1}$) and pulled (700 ml·min$^{-1}$) out of the vessel. VOCs were trapped onto Porapack™ (Porous Polymer Adsorbent) 50/80 mesh (50 mg; Supelco, Bellefonte, USA) held in glass tubing (5 mm outer diameter) by two plugs of silanised glass wool. The Porapack™ tube was conditioned by washing with redistilled diethyl ether (2 ml) and heating at 130° C. for 4 h under a stream of purified nitrogen.

VOCs collected on the Porapak™ were eluted with 750 μL of redistilled diethyl ether and the samples were stored at −20° C. until analysis.

For the analysis, four samples (1 μL) from each treatment (L-DOPA, D-DOPA and Control) were analyzed on an Agilent 7820A Gas Chromatograph (Agilent Technologies, Santa Clara, California, USA), equipped with a cool column injector, flame ionization detector (FID), and a HP-1 capillary GC column (50 m×0.32 mm internal diameter×0.52 μm film thickness). Hydrogen was the carrier gas. The oven temperature was maintained at 30° C. for 0.1 min, then programmed to increase at 10° C.·min$^{-1}$ until 250° C., and then held for 38 min. Tentative identifications were made by Kovats' Index values and GC peak enhancement on GC columns of HP-1, using authentic samples of chemicals compounds.

Figure 4:
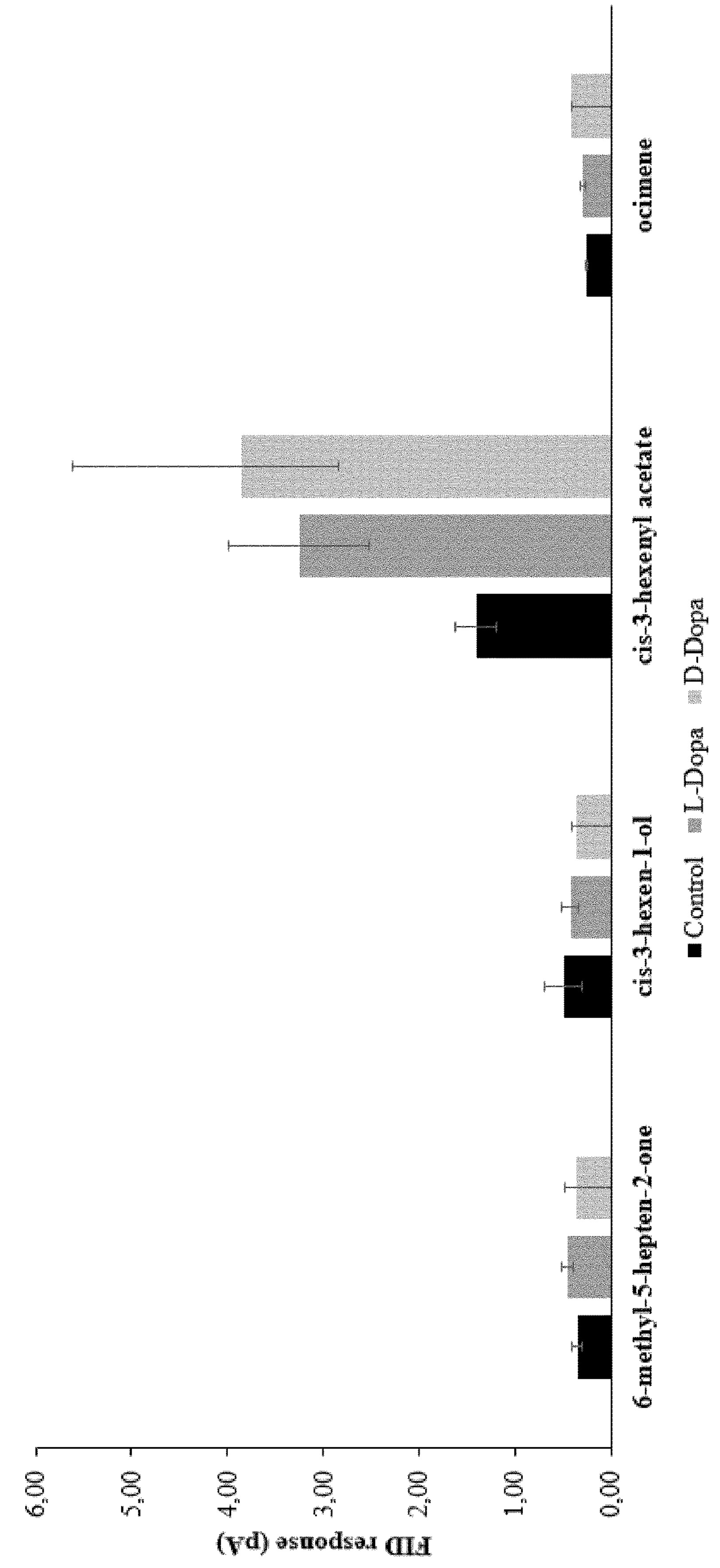
FIG. 4 shows the FID response (pA) of the volatile organic compounds (VOCs) 6-methyl-5-hepten-2one, cis-3-hexen-1-ol, cis-3-hexenyl acetate and Ocimene, produced by bean plants (*Vicia faba*) grown in untreated hydroponic medium (control) and treated hydroponic medium with L-DOPA and D-DOPA at 0.1 ppm.

The results obtained are represented in FIG. 4. A change is observed in the concentration of 6-methyl-5-hepten-2one, cis-3-hexenyl acetate and ocimene triggered by the action of L-DOPA and D-DOPA on the plant. However, in untreated plants (control) it is observed that the concentration is lower, except for the cis-3-hexen-1-ol.

Example 4. Induction Assay on Bean Plants (*Phaseolus vulgaris*) in Soil

Bean (*Phaseolus vulgaris* cv CGB0002) plants were grown in sterile soil for 5 days, and treated with L-DOPA (10 μg), D-DOPA (10 μg) or HPLC water (control, 10 μl) dissolved in 30 mL of distilled water.

After 24 h, the volatile organic compounds (VOCs) emitted from the plant were collected through a dynamic headspace.

The bean plants were enclosed in a glass vessel with a volume of 3.2 I. The bottom of the vessel was enclosed around the top of the pot. Air that had been purified by passage through an activated charcoal filter (BDH, 10-14 mesh) was pushed into (750 ml·min$^{-1}$) and pulled (700 ml·min$^{-1}$) out of the vessel. VOCs were trapped onto Porapack™ (Porous Polymer Adsorbent) 50/80 mesh (50 mg; Supelco, Bellefonte, USA) held in glass tubing (5 mm outer diameter) by two plugs of silanised glass wool. The Porapack™ tube was conditioned by washing with redistilled diethyl ether (2 ml) and heating at 130° C. for 4 h under a stream of purified nitrogen.

VOCs collected on the Porapak™ were eluted with 750 μL of redistilled diethyl ether and the samples were stored at −20° C. until analysis.

For the analysis, four samples (1 μL) from each treatment (L-DOPA, D-DOPA and Control) were analyzed on an Agilent 7820A Gas Chromatograph (Agilent Technologies, Santa Clara, California, USA), equipped with a cool column injector, flame ionization detector (FID), and a HP-1 capillary GC column (50 m×0.32 mm internal diameter×0.52 μm film thickness). Hydrogen was the carrier gas. The oven temperature was maintained at 30° C. for 0.1 min, then programmed to increase at 10° C.·min$^{-1}$ until 250° C., and then held for 38 min. Tentative identifications were made by Kovats' Index values and GC peak enhancement on GC columns of HP-1, using authentic samples of chemicals compounds.

Figure 5:
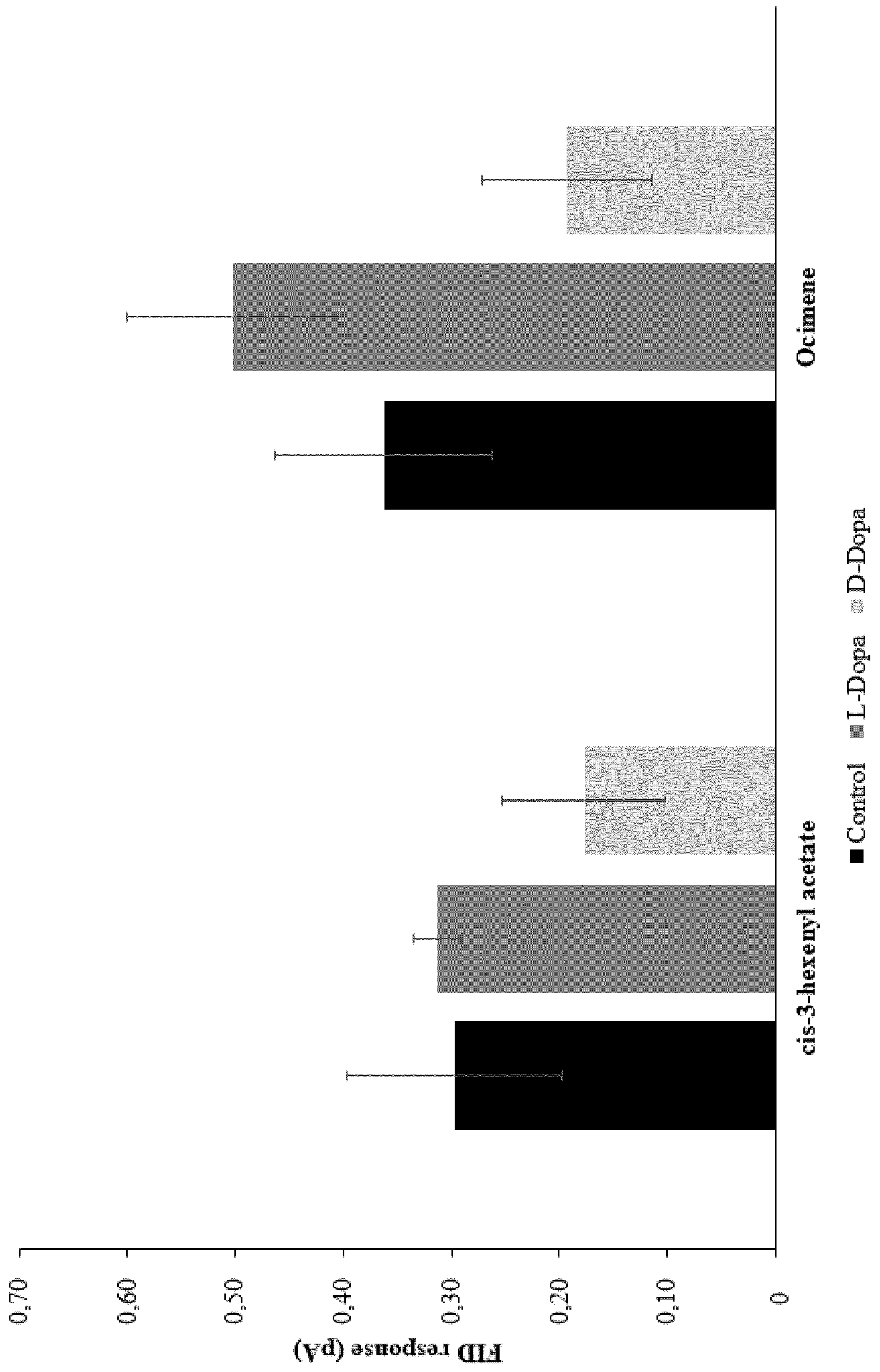
FIG. 5 shows the FID response (pA) of the volatile organic compounds (VOCs) cis-3-hexenyl acetate and Ocimene, produced by bean plants (*Phaseolus vulgaris*) grown in untreated soil (control) and treated soil with L-DOPA and D-DOPA at 0.1 ppm.

The results obtained are represented in FIG. 5. A change is observed in the concentration of VOCs triggered by the action of L-DOPA on the plant.

Example 5. Induction Assay on Bean Plants (*Phaseolus vulgaris*) in Hydroponic Medium Beans (*Phaseolus vulgaris* cv CGB0002) were sown in sterile vermiculite and kept in a glasshouse at 27° C. After 17 days, the seedlings were gently removed from the vermiculite. They were then placed in glass beakers containing 150 mL of hydroponic solution made with Hoagland's modified basalt salt mixture, (MP, USA), and maintained in an environmental chamber at 27° C. Each beaker, containing one seedling, was wrapped in aluminum foil to hold the plants in position and to prevent the light from reaching the roots. After 2 days plants were treated with L-DOPA (10 μg), D-DOPA (10 μg) or HPLC water (control, 10 μl).

After 24 h, the volatile organic compounds (VOCs) emitted from the plant were collected through a dynamic headspace.

The bean plants were enclosed in a glass vessel with a volume of 3.2 I. The bottom of the vessel was enclosed around the top of the pot. Air that had been purified by passage through an activated charcoal filter (BDH, 10-14 mesh) was pushed into (750 ml·min$^{-1}$) and pulled (700 ml·min$^{-1}$) out of the vessel. VOCs were trapped onto Porapack™ (Porous Polymer Adsorbent) 50/80 mesh (50 mg; Supelco, Bellefonte, USA) held in glass tubing (5 mm outer diameter) by two plugs of silanised glass wool. The Porapack™ tube was conditioned by washing with redistilled diethyl ether (2 ml) and heating at 130° C. for 4 h under a stream of purified nitrogen.

VOCs collected on the Porapak™ were eluted with 750 μL of redistilled diethyl ether and the samples were stored at −20° C. until analysis.

For the analysis, four samples (1 μL) from each treatment (L-DOPA, D-DOPA and Control) were analyzed on an Agilent 7820A Gas Chromatograph (Agilent Technologies, Santa Clara, California, USA), equipped with a cool column injector, flame ionization detector (FID), and a HP-1 capillary GC column (50 m×0.32 mm internal diameter×0.52 μm film thickness). Hydrogen was the carrier gas. The oven temperature was maintained at 30° C. for 0.1 min, then programmed to increase at 10° C.·min$^{-1}$ until 250° C., and then held for 38 min. Tentative identifications were made by Kovats' Index values and GC peak enhancement on GC columns of HP-1, using authentic samples of chemicals compounds.

Figure 6:
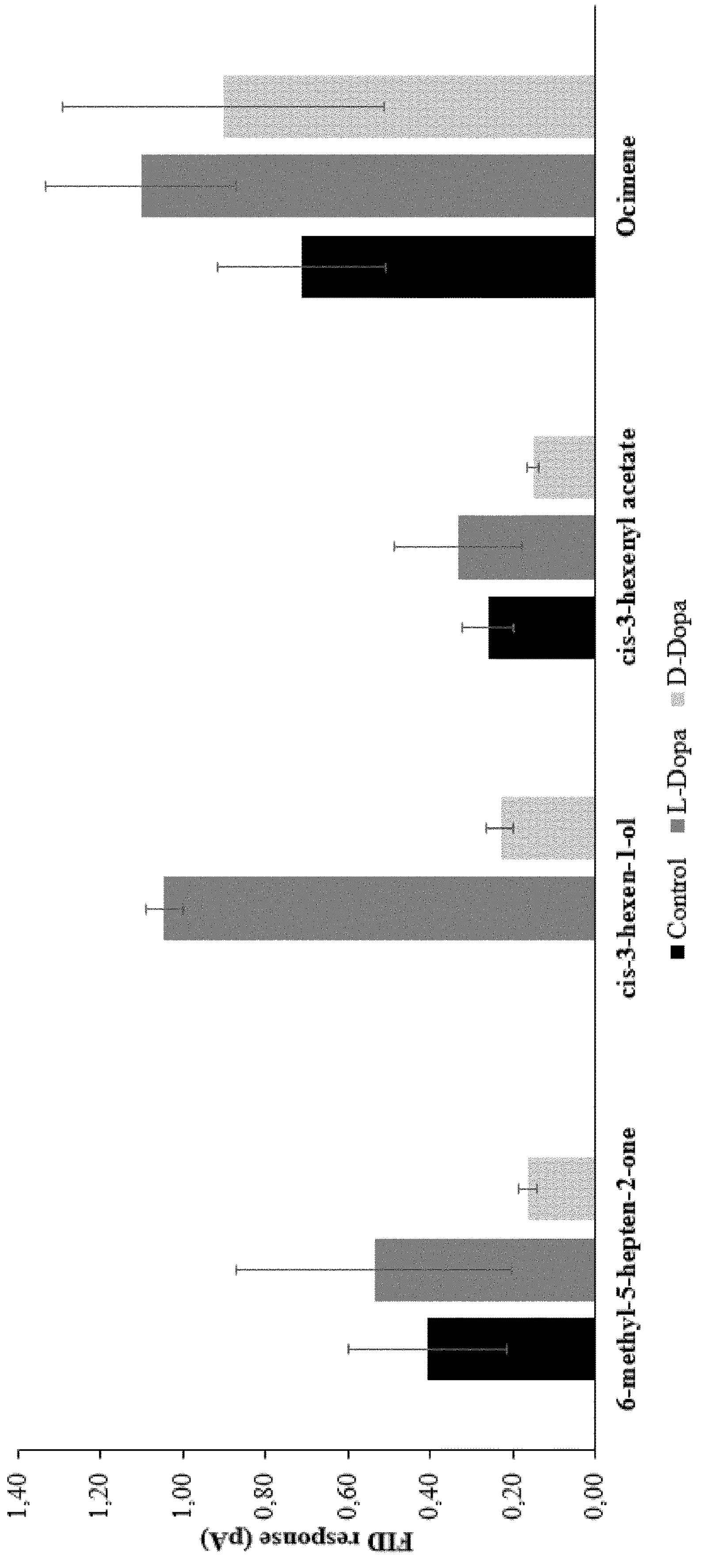
FIG. 6 shows the FID response (pA) of the volatile organic compounds (VOCs) 6-methyl-5-hepten-2one, cis-3-hexen-1-ol, cis-3-hexenyl acetate and Ocimene produced by bean plants (*Phaseolus vulgaris*) grown in untreated hydroponic medium (control) and treated hydroponic medium with L-DOPA and D-DOPA at 0.1 ppm.

The results obtained are represented in FIG. 6. A change is observed in the concentration of 6-methyl-5-hepten-2one and cis-3-hexenyl acetate triggered by the action of L-DOPA and in the concentration of cis-3-hexen-1-ol and ocimene by the action of L-DOPA and D-DOPA on the plant. In untreated plants (control) it is observed that the concentration is lower, and even some compounds are not emitted, as cis-3-hexen-1ol.

Example 6. Induction Assay on Wheat Plants (*Triticum monococcum*) in Soil

Wheat (*Triticum monococcum* VAR Tocayo) plants were grown in sterile soil for 15 days (20 seeds per pot), and treated with L-DOPA (10 μg), D-DOPA (10 μg) or HPLC water (control, 10 μl) dissolved in 30 mL of distilled water.

After 24 h, the volatile organic compounds (VOCs) emitted from the plant were collected through a dynamic headspace.

The wheat plants were enclosed in a glass vessel with a volume of 3.2 I. The bottom of the vessel was enclosed around the top of the pot. Air that had been purified by passage through an activated charcoal filter (BDH, 10-14 mesh) was pushed into (750 ml·min$^{-1}$) and pulled (700 ml·min$^{-1}$) out of the vessel. VOCs were trapped onto Porapack™ (Porous Polymer Adsorbent) 50/80 mesh (50 mg; Supelco, Bellefonte, USA) held in glass tubing (5 mm outer diameter) by two plugs of silanised glass wool. The Porapack™ tube was conditioned by washing with redistilled diethyl ether (2 ml) and heating at 130° C. for 4 h under a stream of purified nitrogen.

VOCs collected on the Porapak™ were eluted with 750 μL of redistilled diethyl ether and the samples were stored at −20° C. until analysis.

For the analysis, four samples (1 μL) from each treatment (L-DOPA, D-DOPA and Control) were analyzed on an Agilent 7820A Gas Chromatograph (Agilent Technologies, Santa Clara, California, USA), equipped with a cool column injector, flame ionization detector (FID), and a HP-1 capillary GC column (50 m×0.32 mm internal diameter×0.52 μm film thickness). Hydrogen was the carrier gas. The oven temperature was maintained at 30° C. for 0.1 min, then programmed to increase at 10° C.·min$^{-1}$ until 250° C., and then held for 38 min. Tentative identifications were made by Kovats' Index values and GC peak enhancement on GC columns of HP-1, using authentic samples of chemicals compounds.

Figure 7:
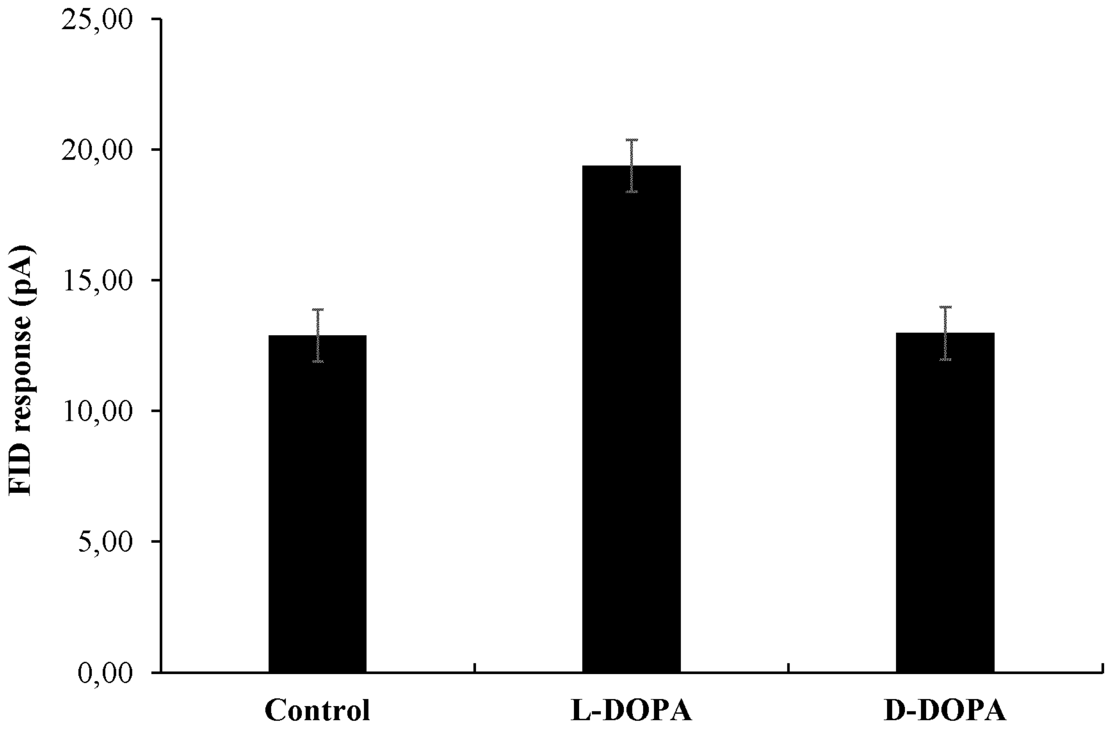
FIG. 7 shows the FID response (pA) of the volatile organic compound (VOC) ocimene produced by wheat plants (*Triticum monococcum*) grown in untreated soil (control) and treated soil with L-DOPA and D-DOPA at 0.1 ppm.

The results obtained are represented in FIG. 7. A change is observed in the concentration of ocimene triggered by the action of L-DOPA. It wasn't observed the emission of other VOCs (6-methyl-5-hepten-2one, cis-3-hexen-1-ol and cis-3-hexenyl acetate).

Example 7. Estimation of Total Phenolic Content in Bean Plant (*Vicia faba*) Leaves The estimation of total phenolic content in bean plant leaves (*Vicia faba*) was based on the procedure developed by Ainsworth, E. A. et al. (2007) using Folin-Ciocalteu (F-C) reagent. F-C assay is commonly been used to assay total phenolic content. The F-C assay provides a convenient, rapid, and simple estimation of the content of total phenolics, and other oxidation substrates in plant extracts.

Broad bean (*Vicia faba* cv *Histal*) plants were grown in a mixture of sterile soil/vermiculite (7:3) for 10 days, and treated with L-DOPA (10 μg), D-DOPA (10 μg) or HPLC water (control, 10 μl) dissolved in 30 mL of distilled water. After 24 h harvest leaves material (approximately 20 mg) in screw-capped tubes and freeze immediately in liquid nitrogen.

To homogenize the tissue, three tungsten carbide beads and 2 ml of ice-cold 95% (vol/vol) methanol were added in each sample tube and insert samples into pre-cooled Teflon adaptors. Tissue was homogenized for 5 min at 30 Hz. Then the tungsten carbide beads were removed with a magnet and the samples were incubated at room temperature for 48 h in the dark.

After that, the samples were centrifuged (13,000 g for 5 min at room temperature) and supernatant was collected in a fresh 2-ml microtube.

Subsequently, 100 µl of each sample supernatant, standard or 95% (vol/vol) methanol blank were added to duplicate 2-ml microtubes.

After that, 200 µl 10% (vol/vol) Folin-Ciocalteu reagent was added into each tube. All samples were thoroughly vortexed. Then, 800 µl of $Na_2CO_3$ (700 mM) was added into each tube and the assay tubes were incubate at room temperature for 2 h.

Finally, a 200 ml sample, standard or blank from the assay tube were transferred to a clear 96-well micro-plate and the absorbance of each was measured at 750 nm using a spectrophotometer.

For calculate the total phenolic content, first a standard curve from the blank-corrected $A_{750}$ of the gallic acid standards was calculated. Then, the regression equation between gallic acid standards and A750 was used to calculate total phenolics content. The concentration of total phenolic compounds was expressed in mg gallic acid equivalents (GAE) per ml of extract.

Figure 8:
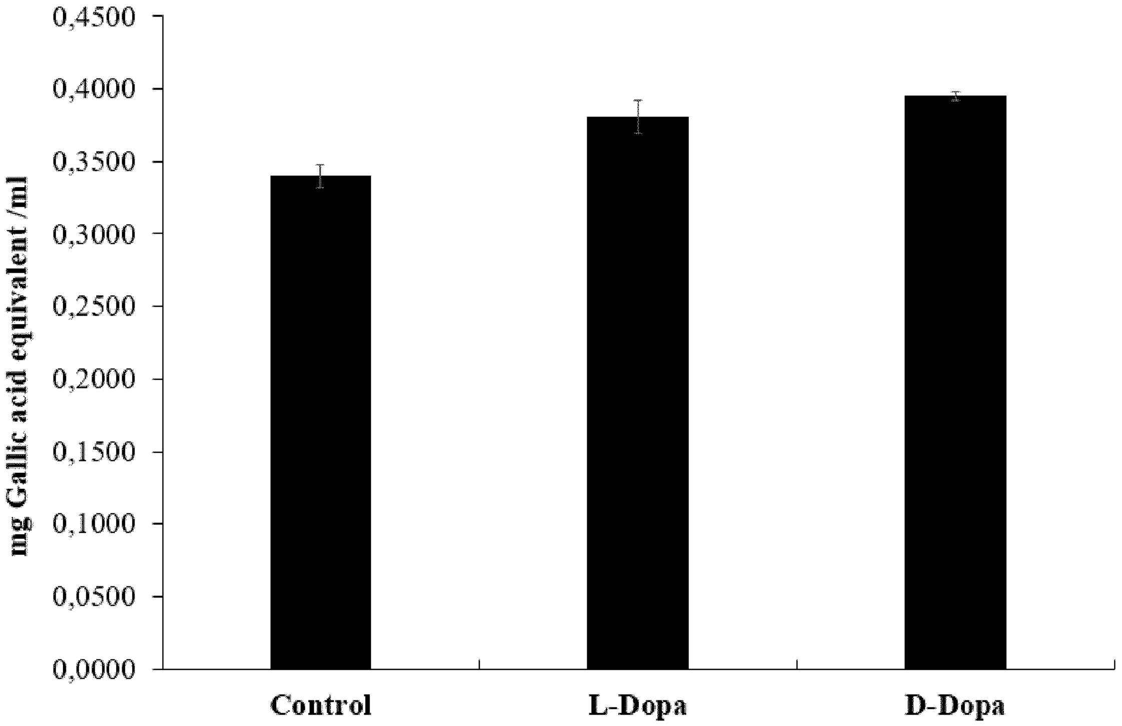
FIG. 8 shows the total phenolic content, expressed as mg gallic acid equivalent/ml, in bean plant (*Vicia faba*) treated with L-DOPA, D-DOPA and control (untreated).

The results obtained are represented in FIG. 8. It is observed that the total phenolic content is higher for plants treated with L-DOPA and D-DOPA in contrast to the content obtained for untreated plants (control). Monoterpenes such as ocimene are derived biosynthetically from units of isopentenyl pyrophosphate, which is formed from an enzyme called acetyl-CoA. Phenolic compounds also are formed from that enzyme. Dopa and its enantiomers upregulated some enzymes related to monoterpene and phenol synthesis that could explain why the method of the present invention increase the phenolic content.

REFERENCES

Baluška, F., Mukherjee, S., Ramakrishna, A. "Neurotransmitters in Plant Signaling and Communication".

Nishihara, E., Parvez, M. M., Araya, H., & Fujii, Y. (2004). Germination growth response of different plant species to the allelochemical L-3,4-dihydroxyphenylalanine (L-DOPA). Plant Growth Regulation, 42(2), 181-189.

Ainsworth, E. A., & Gillespie, K. M. (2007). Estimation of total phenolic content and other oxidation substrates in plant tissues using Folin-Ciocalteu reagent. Nature protocols, 2(4), 875-877.

The invention claimed is:

1. A method for enhancing plant attractiveness to beneficial insects, comprising applying at least one time a composition comprising an effective amount of an enantiomer of 3,4-dihydroxyphenylalanine (DOPA) selected from the group consisting of L-3,4-dihydroxyphenylalanine (L-DOPA), D-3,4-dihydroxyphenylalanine (D-DOPA) and a mixture thereof to the leaves and/or stem of the plant, whereby the application of DOPA induces the emission of at least one volatile organic compound (VOC), wherein the beneficial insects belong to the Braconidae family.

2. The method according to claim 1, wherein the beneficial insects belong to the Aphidiinae subfamily.

3. The method according to claim 2, wherein the beneficial insect is *Aphidius ervi*.

4. The method according to claim 1, wherein the plant is selected from the group consisting of plant species belonging to the Poaceae family, Solanaceae family, Brassicaceae family, Rutaceae family, Rosacea family, Rhamnaceae family, Apiaceae family and Leguminosae family.

5. The method according to claim 1, wherein the composition is applied to the plant before a pest infestation or after the application of a chemical agent selected from the group consisting of insecticide, fungicide, acaricide, antivirus, chemical compounds to control a pest infestation and a mixture thereof.

6. The method according to claim 1, wherein the composition is applied at least one time to the plant by spraying, spreading, fogging, dipping, drenching, dusting, injection into the plant substrate, or adding in the irrigation water.

7. The method according to claim 1, wherein the composition is applied to plants in hydroponic or soil culture cultivation.

8. The method according to claim 1, wherein the composition comprises a further active ingredient selected from the group consisting of phytohormones, herbicides, fungicides, amino acids, humics components, organic compounds, polyphenolics, micronutrients, fertilizers, elicitors, plant growth regulators, biostimulants and combinations thereof.

9. The method according to claim 1, wherein the composition is applied to the plant at least once every three months.

10. The method according to claim 1, wherein the at least one volatile organic compound (VOC) is selected from the group consisting of 6-methyl-5-hepten-2-one, cis-3-hexen-1-ol, cis-3-hexenyl acetate, and ocimene.

* * * * *